Jan. 5, 1960     W. E. SEHN ET AL     2,919,478
WEATHER STRIP STRUCTURE
Filed Sept. 25, 1956     2 Sheets-Sheet 1
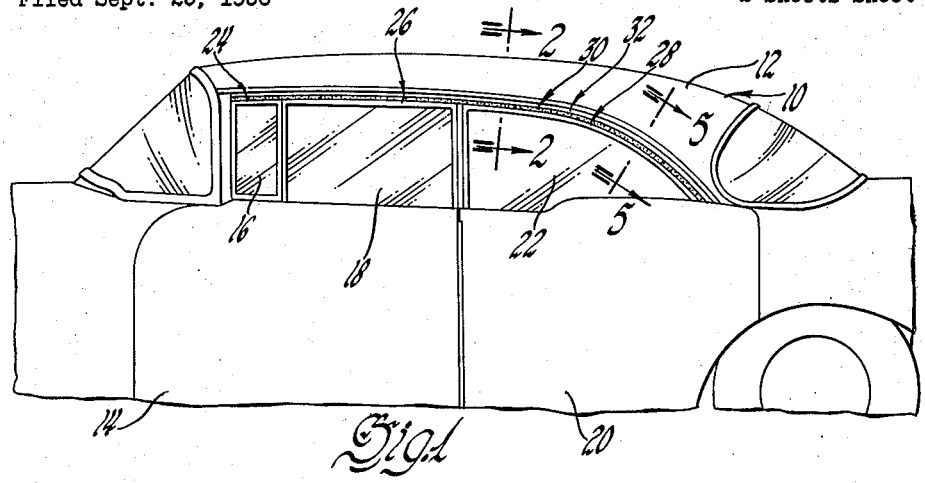
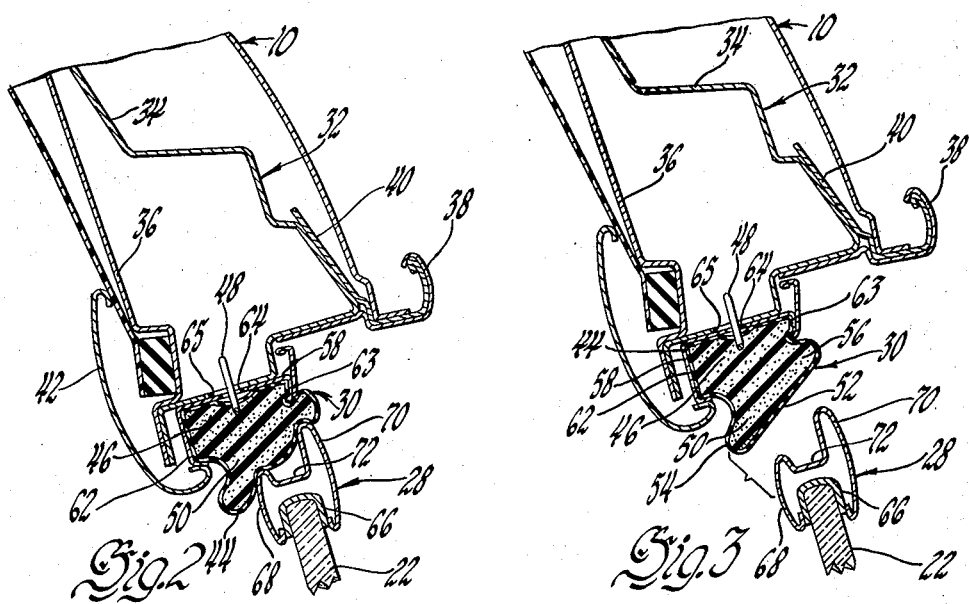
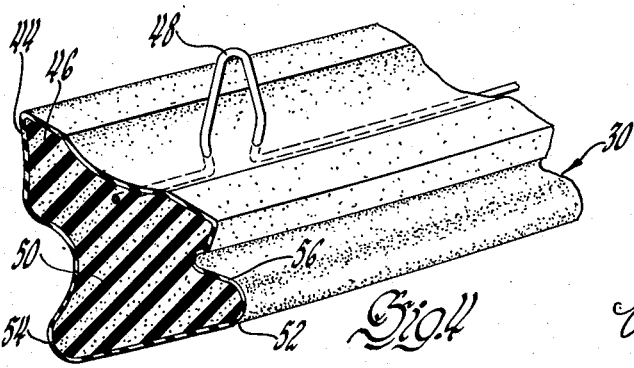
INVENTORS
William E. Sehn &
BY James H. Wernig
W. C. Middleton
ATTORNEY

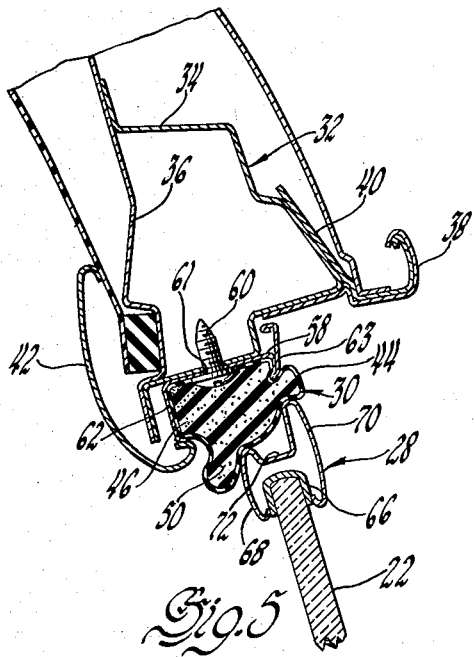
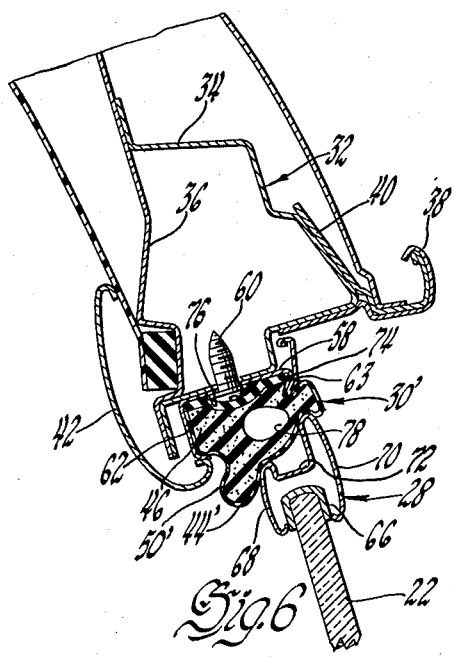
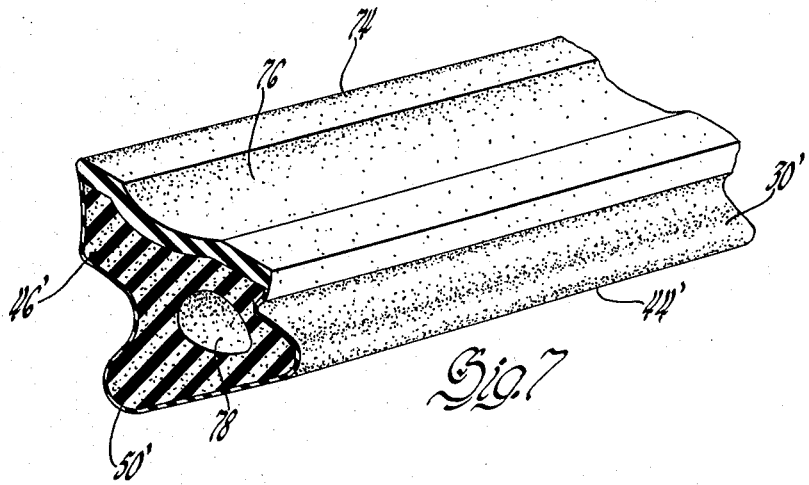

United States Patent Office 2,919,478
Patented Jan. 5, 1960

2,919,478

WEATHER STRIP STRUCTURE

William E. Sehn, Highland Park, and James H. Wernig, Birmingham, Mich., assignors to General Motors Corporation, Detroit, Mich., a corporation of Delaware Application September 25, 1956, Serial No. 611,876

6 Claims. (Cl. 20—69)

This invention relates to weather sealing structures and particularly to weather sealing structures for vehicle bodies.

In vehicle bodies of the "convertible" type having either hard or soft tops, there is no door supporting frame at the normally upper edges of the windows. Consequently, the elements must be kept from the interior of the bodies by a sealing means, such as a weather strip, disposed between a roof rail portion of the body and these upper edges of the windows. Such a weather strip and related structures must be adapted to permit opening and closing of both the windows and the doors as well as accommodate misalignments without interference or undue wear from repeated openings and closings. Furthermore, the sealing structures must be able to collect and drain off any leakage that may occur.

The present invention with these and other considerations in mind seeks to provide an improved weather sealing structure that effectively seals the space between the roof rail and the edges of the closed window.

Specifically, the invention contemplates an elongated resilient weather strip of substantially constant transverse section that extends the length of the roof rail and coacts with adjacent window frame members in the closed positions to provide a sealing engagement therebetween; that has re-enforcing means to increase the rigidity of the strip; and that is easily attached to the roof rail.

These window frame members are adapted in the closed positions to provide a trough or channel coextensive with the roof rail to drain leakage water into door wells.

The foregoing and other objects and advantages of the invention will be apparent from the following description and from the accompanying drawings, in which:

Figure 1 is a fragmentary side view of a vehicle incorporating sealing structure according to the invention.

Figure 2 is an enlarged fragmentary section along the lines 2—2 of Figure 1 with the door and window closed.

Figure 3 is a section similar to Figure 2 showing the window partially opened.

Figure 4 is an enlarged perspective view of a section of one embodiment of the weather strip.

Figure 5 is an enlarged fragmentary section along the lines 5—5 of Figure 1.

Figure 6 is an enlarged fragmentary section similar to Figure 5 of structure employing another embodiment of the weather strip.

Figure 7 is an enlarged perspective view of a section of the weather strip in Figure 6.

In Figure 1 an embodiment of the invention is shown incorporated in a vehicle body 10 of the four-door hardtop (pillarless) type. This vehicle body 10 includes a roof 12, a front door 14 having both a side vent window 16 and a front window 18, and a rear door 20 with a rear window 22. Each of the windows 16, 18 and 22 include window frame members 24, 26 and 28, respectively, which frame members engage in the positions depicted a weather sealing strip or member 30 secured to a roof rail portion 32 of the roof 12. Both of the doors 14 and 20 are swingable at their forward ends about vertical hinge axes and the windows 18 and 22 are raised and lowered while the side vent window pivots to open and closed positions, all in a known manner.

As shown by the Figure 2 transverse sectional view, the roof rail 32 of box-shape extends the length of the roof 10 and includes an outer wall member 34 having outwardly extending ends welded or otherwise secured to an inner wall member 36. A rain gutter is formed along the roof edge by a gutter strip 38 having a flange 40 which extends underneath roof 12 and is welded to the outside surface of the outer wall 34. On the inside of the vehicle body an interior trim molding 42 is attached by screws (not shown) to the inner wall member 36.

The weather sealing strip 30, referring to Figures 3, 4 and 5, is of one piece for installation the length of the roof rail 32. Strip 30 has a constant transverse section and is composed of resilient material, such as sponge rubber or the like, enclosed by a cover means 44, e.g., a suitable cloth fabric formed integrally in the rubber, cemented, or otherwise secured to a skin on the rubber surface which prevents absorption of water by the porous sponge rubber. This cover means is employed to stiffen the sponge rubber and in addition, provides a relatively noiseless sliding surface with desirable wear qualities. In transverse section the weather strip has a base portion 46 with a series of wire clips 48 integrally molded in the base portion re-enforcing the strip, and a body portion 50 having an oblique sealing face or surface 52 with arcuate ends 54 and 56. To install the weather strip 30, a weather strip retainer 58 is first attached to the bottom of the outer wall member 34 by screws 60 (see Fig. 5) which preferably pass through elongated openings 61 in the retainer to permit adjustment of the relative positions of the retainer and the roof rail 32. Then the weather strip is positioned between extending flanges 62 and 63 having inwardly offset ends. These flanges 62 and 63 clampingly retain the strip together with the clips 48 which pass through clearance apertures 64 in the retainer and engage the sides of spaced openings 65 in the wall member 34. With the weather strip 30 installed, the oblique surface 52 extends downwardly and outwardly relative to the vehicle body.

Each of the window glass frames 24, 26 and 28 at their normally top edges are of the same H-shaped configuration with each of their bottom legs defining a channel for fixedly receiving the window glass and a suitable weather strip 66. Since these frames are the same, only frame 28 in Figures 2 and 5 will be explained. Frame 28 comprises an inboard flange 68 and an outboard flange 70 outlining an intermediate trough or drain gutter 72 which, with the window closed, will provide a drain passage to door wells (not shown) at the front and rear of the door 20 and the front door 14 has a door well at the end and employs the well between the doors at the rear end. The outboard flange 70 of the frame members is made substantially longer than the inboard flange 68 so that the arcuate edges of the flanges are in a plane of the same inclination as the oblique sealing surface 52. With the windows open, the weather strip 30 will be unstressed as in Figure 3. Upon closing the window, the flanges 68 and 70 engage the oblique sealing surface 52 as in Figures 2 and 5 deforming the resilient material until it extends around the arcuate edges of the flanges, consequently providing a more effective sealing engagement of greater area.

Figures 6 and 7 depict a modified weather strip 30' shaped similarly to the weather strip 30 but having attached to the base portion 46', a reenforcing mechanical rubber strip 74 with a recess 76 for screw head clearance. The body portion 50' has an optional longitudinally extending bore 78 to increase the deformability of the strip. A cover means 44' is added to the sponge rubber as in the Figure 4 embodiment and for the same reasons. The weather strip 30' is secured to the roof rail 32 in the same manner as the weather strip 30; that is, by means of the retainer 58.

In this roof rail weather sealing arrangement, the sealing surface 52 has an inclination that renders the weather strip effective as a seal whether the engaging flanges 68 and 70 of the window frame move into engagement when the window is raised with the door closed or when the door is closed with the window raised. When in sealing engagement, the resilient material flows over a large portion of the flanges 68 and 70 without unnecessary bulges or without interference with the drain trough 72. Also, with the drain trough 72 being integral with the window frames and being coextensive with the roof rail 32, this serious leakage problem is solved without additional and expensive structures.

We claim:

1. In a vehicle body having a roof rail portion, the combination of a window movable to opened and closed positions, an elongated weatherstrip of resilient material adapted to be attached to the roof rail portion of the body, the weatherstrip being provided with an inclined sealing surface, and a frame member attached to said window, the frame member having a short innermost flange and a long outermost flange together defining a drain trough therebetween, the flanges being arranged in the closed position of the window so that the weatherstrip is compressed to effect a sealing engagement between each flange and the inclined sealing surface and so that the inclination of the sealing surface is maintained.

2. In a vehicle body having a roof rail portion, the combination of a window movable to opened and closed positions, an elongated weatherstrip of resilient material adapted to be attached to the roof rail portion of the vehicle body, the elongated weatherstrip having a sealing surface inclined so as to face downwardly and outwardly relative to the vehicle body, and a frame member secured to the window, the frame member having a short inboard flange and a long outboard flange together defining a drain trough therebetween, the flanges extending upwardly in substantial parallelism and having arcuate edges, the plane formed by the arcuate edges of the flanges being substantially coincident with the plane of the inclined sealing surface so that with the window in the closed position the weatherstrip is compressed by the arcuate edges thereby effecting a sealing engagement with the sealing surface while maintaining the inclination of the sealing surface.

3. In a vehicle body having a roof rail portion, the combination of a window movable to opened and closed positions, a retainer secured to the roof rail portion, an elongated weatherstrip of resilient material comprising a base section adapted to be attached to the retainer and a body section, the weatherstrip body section being provided with an inclined sealing surface aligned so as to face downwardly and outwardly relative to the vehicle body, and an H-shaped frame member so constructed as to provide oppositely disposed channels, one of the channels fixedly receiving the window and the other of the channels having a short inboard flange and a long outboard flange together defining a drain trough therebetween, the flanges extending upwardly in substantial parallelism and being provided with arcuate edges for engaging the inclined sealing surface when the windows are in the closed positions, the lengths of the flanges being so correlated that the arcuate edges thereof form a plane substantially coincident with the plane of the inclined surface of the weatherstrip, the flange arcuate edges and the weatherstrip sealing surface coacting so that with the window in the closed position the weatherstrip is compressed by the arcuate edges thereby effecting a sealing engagement with the sealing surface while maintaining the inclination of the sealing surface.

4. In a vehicle body having a roof rail portion, the combination of a window movable to opened and closed positions, a retainer secured to the roof rail portion, an elongated weatherstrip of resilient material comprising a base section adapted to be attached to the retainer and a body section, means for re-enforcing the weatherstrip so as to increase the rigidity thereof, the weatherstrip body section being provided with an inclined sealing surface aligned so as to face downwardly and outwardly relative to the vehicle body, and an H-shaped frame member so constructed as to provide oppositely disposed channels, one of the channels fixedly receiving the window and the other of the channels having a short inboard flange and a long outboard flange together defining a drain trough therebetween, the flanges extending upwardly in substantial parallelism and being provided with arcuate edges for engaging the inclined sealing surface when the windows are in the closed positions, the lengths of the flanges being so correlated that the arcuate edges thereof form a plane substantially coincident with the plane of the inclined surface of the weatherstrip, the flange arcuate edges and the weatherstrip sealing surface coacting so that with the window in the closed position the weatherstrip is compressed by the arcuate edges thereby effecting a sealing engagement with the sealing surface while maintaining the inclination of the sealing surface.

5. In a vehicle body having a roof rail portion, the combination of adjacent windows movable to opened and closed positions, a retainer secured to the roof rail portion of the vehicle body, an elongated weatherstrip of resilient material comprising a base section attached to the retainer and a body section provided with a sealing surface inclined so as to face outboard of the vehicle body, the weatherstrip having a re-enforcing member of harder material than the resilient material of the weatherstrip secured to the base section thereof adjacent the retainer and a longitudinally extending bore within the weatherstrip for increasing the deformability thereof, and an H-shaped window frame member so constructed as to provide oppositely disposed channels, one of the channels fixedly receiving the window and the other of the channels having a short inboard flange and a long outboard flange together defining a drain trough therebetween, the flanges extending upwardly in substantial parallelism and having arcuate edges, the plane formed by the arcuate edges of the flanges being substantially coincident with the plane of the inclined sealing surface on the weatherstrip, the flange arcuate edges and the weatherstrip sealing surface coacting so that with the windows in the closed position the weatherstrip is compressed by the arcuate edges thereby effecting a sealing engagement with the sealing surface while maintaining the inclination of the sealing surface.

6. In a vehicle body having a roof rail portion; the combination of adjacent windows movable to opened and closed positions; a resilient elongated weatherstrip of substantially constant transverse section comprising an embedded re-enforcing member having external clips, an oblique sealing surface and cover means for said sealing surface; a retainer clamped to the weatherstrip and having openings for receiving the clips; means for adjustably securing the retainer to the vehicle body roof rail portion; and an H-shaped window frame member having oppositely disposed channels; one of the channels fixedly secured to each of the windows and the other of the channels having a substantially upright long outboard flange and a substantially upright short inboard flange together defining a drain trough therebetween; each flange being provided with arcuate edges; the plane established by the arcuate edges of the flanges being substantially coincident with the plane of the oblique sealing surface, the flange arcuate edges and the weatherstrip sealing surface coacting so that with the windows in the closed positions the weatherstrip is compressed by the arcuate edges thereby effecting a sealing engagement with the oblique sealing surface while maintaining the inclination of the sealing surface.

References Cited in the file of this patent

UNITED STATES PATENTS

| | | |
|---|---|---|
| 2,474,985 | Rivard et al. | July 5, 1949 |
| 2,498,852 | Doty | Feb. 28, 1950 |
| 2,602,202 | Orr | July 8, 1952 |
| 2,687,914 | Schrum | Aug. 31, 1954 |
| 2,719,343 | Harris | Oct. 4, 1955 |
| 2,737,412 | Smith et al. | Mar. 6, 1956 |